UNITED STATES PATENT OFFICE.

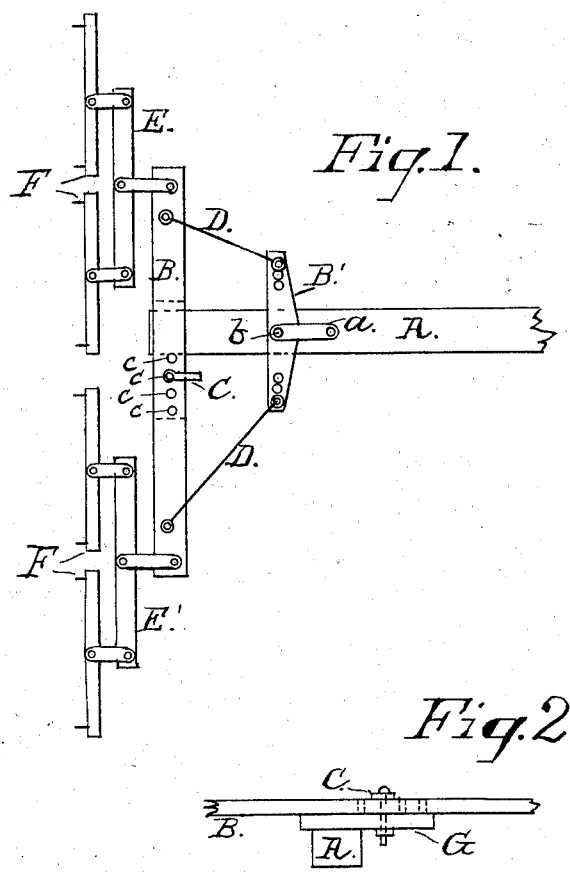

DAVID LAWRENCE AND JOHN VINCENT, OF TOM BEAN, TEXAS.

DRAFT-EQUALIZER.

SPECIFICATION forming part of Letters Patent No. 720,037, dated February 10, 1903.

Application filed September 15, 1902. Serial No. 123,437. (No model.)

*To all whom it may concern:*

Be it known that we, DAVID LAWRENCE and JOHN VINCENT, citizens of the United States, residing at Tom Bean, in the county of Grayson and State of Texas, have invented certain new and useful Improvements in Draft-Equalizers; and we do hereby declare the following to be a full, clear, and exact description of the invention, such as will enable others skilled in the art to which it appertains to make and use the same.

The nature of the work in the pulling of a sulky-plow or a disk plow is such that when four horses are employed with the equalizers now in use one horse invariably walks on the plowed ground in order that the load or plow may be in the center of draft. This walking of one horse on the plowed ground is a waste of horseflesh, because the stirred ground is loose. To put three horses on the left side of the beam and only one horse on the right side creates side draft and causes the plow to take in more land than it can turn or pulverize.

Our invention relates, first, to the taking away of the side draft; second, to enable the plow to follow the furrow; third, to work three, four, or five horses to the same bars by simply adjusting said bars; fourth, to enable all horses except one to walk on solid ground, the one to walk in furrow; fifth, to enable the operator to place load on any point of the bars he chooses and still have a straight pull. As the drawings appear it is adjusted for four horses; but five horses can be used by removing doubletree E' and substituting a three-horse evener, the draft being equalized by moving stay-rod D' one or more holes nearer the center of draft-bar B. If the operator has an uneven team, the stay-rods D and D' may be adjusted in draft-bar to the advantage of the team or horse it is desired to favor. We attain these objects by the mechanism illustrated in the accompanying drawings.

Figure 1 is a top view of the entire device; Fig. 2, a detailed front view showing end of beam with plate for support of bar to which doubletrees are attached.

Like letters of reference designate corresponding parts in both figures of the drawings.

A designates the beam of a plow, and secured loosely to the front end of same are transverse bars B B'. B is simply held in position laterally by clevis C, the draft being communicated through rods D D' to bar B', which is pivoted to plow-beam by strap $a$ and pin $b$. To the bar B are connected doubletrees E E', having singletrees F of the ordinary construction. The series of holes $c$ in bar B are larger than the pin, and the services of clevis and pin are only required in turning at end of field. The plate G, bolted to end of plow-beam, acts as a rest for bar B.

The invention has the following advantages: It is simple, strong, and durable, prevents side draft, and the horses are arranged conveniently for driving.

Changes in the form, proportion, and minor details of construction may be resorted to without departing from the spirit or sacrificing any of the advantages of this invention.

What we claim is—

In a draft-equalizer, the combination with the plow-beam of a front bar B, provided with a series of holes $c$ and loosely pivoted near the front end of said beam, a rear beam B' pivoted to said beam at a fixed point thereof and provided with a series of holes in each end, rods D, D' connecting the ends of the bar B to the ends of B' and adjustable on the latter by shifting from one of said holes to the other doubletrees pivotally attached to the ends of bar B, and a clevis C adapted to be shifted from one of the holes $c$ in said bar to another for regulating the position of said bar laterally with respect to said beam substantially as set forth.

In testimony whereof we affix our signatures in presence of two witnesses.

DAVID LAWRENCE.
JOHN VINCENT.

Witnesses:
J. K. JAMISON,
T. P. HOLT.